(12) United States Patent
Skartland

(10) Patent No.: US 12,011,105 B2
(45) Date of Patent: Jun. 18, 2024

(54) BABY-SAFE DRYING APPARATUS

(71) Applicant: Bianca Skartland, Nashville, TN (US)

(72) Inventor: Bianca Skartland, Nashville, TN (US)

(73) Assignee: Bianca Skartland, Nashville, TN (US)

( * ) Notice: Subject to any disclaimer, the term of this patent is extended or adjusted under 35 U.S.C. 154(b) by 0 days.

(21) Appl. No.: 16/927,222

(22) Filed: Jul. 13, 2020

(65) Prior Publication Data

US 2022/0007899 A1   Jan. 13, 2022

(51) Int. Cl.
| | | |
|---|---|---|
| A47K 10/48 | (2006.01) | |
| A23L 3/00 | (2006.01) | |
| A23L 3/36 | (2006.01) | |
| A47G 21/00 | (2006.01) | |
| F26B 19/00 | (2006.01) | |

(52) U.S. Cl.
CPC ............ *A47G 21/007* (2013.01); *A23L 3/001* (2013.01); *A23L 3/363* (2013.01); *A47K 10/48* (2013.01); *F26B 19/00* (2013.01); *A23V 2002/00* (2013.01)

(58) Field of Classification Search
CPC .......... A47K 10/04; A47K 10/48; F26B 19/00
USPC ........................................................ 34/202
See application file for complete search history.

(56) References Cited

U.S. PATENT DOCUMENTS

| | | | | |
|---|---|---|---|---|
| 4,780,595 A | * | 10/1988 | Alban ................... | A45D 20/16 |
| | | | | 392/364 |
| 2018/0289169 A1 | * | 10/2018 | Le ......................... | H05B 1/0297 |
| 2019/0021285 A1 | * | 1/2019 | Chen .................... | A01K 15/025 |
| 2020/0085250 A1 | * | 3/2020 | Youn ..................... | A47K 10/48 |

* cited by examiner

*Primary Examiner* — John P McCormack

(57) ABSTRACT

A baby-safe drying apparatus, including a generally pair shaped housing having a bottom portion connected to a middle portion tapering to a top portion, an electric fan connected to an interior wall of the housing and operative to draw air into an air inlet and out an air outlet, and a rechargeable battery supported within the bottom portion. The housing has a generally hollow interior with the air inlet located on the bottom portion and the air outlet located on the top portion. The air outlet is generally perpendicular to the housing in an upright position. The electric fan is arranged to be baby-safe. The rechargeable battery operationally providing power to the electric fan. The lower portion has a greater mass than the middle and top portions such that the center of gravity of the housing is lowered.

5 Claims, 5 Drawing Sheets

BABY-SAFE DRYING APPARATUS

BACKGROUND OF THE INVENTION

Field of the Invention

The present invention is generally related to personal dryers and fans, and more particularly to a baby-safe drying apparatus.

Discussion of the Background

Human babies in their early years of life, and some individuals with disabilities and elderly adults, often wear diapers to retain or absorb solid and liquid waste. When a diaper is changed, the soiled diaper is removed, the bottom and crotch area are cleaned, and a new diaper is placed on the baby, disabled individual or elderly adult. To clean, caregivers often use wipes, including cloth or disposable, pre-moistened towelettes. The soiled area is cleaned with the wipe to remove waste residue prior to placing a new diaper on the baby, disabled individual or elderly adult.

The use of baby wipes or moist, disposable towelettes tends to leave the skin of a tender and sensitive portion of the body both wet and cold. This often results in skin rashes and other complications. Diaper rash, also referred to as "dermatitis," is a common form of inflamed skin that appears as a patchwork of bright red tender-looking skin typically in the diaper region, including, without limitation, the buttock, thigh and genital areas (sometimes referred to collectively herein as the "bottom area"). Diaper rash is often associated with wet or infrequently changed diapers, skin sensitivity, and chafing. A diaper rash may result in numerous medical issues including, without limitation, bleeding or oozing of the inflamed skin, and pain associated with urination or bowel movements. It may also sometimes result in an infection. Diaper rash is a common condition experienced by babies and some individuals with disabilities and elderly adults. For a baby, a diaper rash can be painful and may cause them to be more uncomfortable than usual, especially during diaper changes. A baby with a diaper rash often fusses or cries when the diaper area is washed or touched.

Moisture is a common contributor to diaper rash. It is essential to keep a diaper dry and clean to prevent and treat a diaper rash. It is encouraged to allow a baby's bottom to air dry as well as giving the baby time without a diaper during the day. However, it is common for a baby's bottom to not be fully cleaned and dried during a diaper change and before application of another diaper. This is primarily due to the time it takes to fully dry the area where a diaper is applied. In situations where a diaper rash occurs, it may typically be cleared up using at-home treatments, such as air drying, more frequent diaper changes and ointment. Before ointment is applied, it is essential that the skin be fully dried. Otherwise, the ointment traps the moisture against the skin, thereby negating any benefit derived by use of the ointment.

Another problem for care givers relates to drying a baby, disabled individual or elderly adult after a bath. After a bath, the entire body is wet and it is often difficult to get the body completely dry and to remove all of the wetness. This is particularly true for the bottom area, between the baby's toes and fingers and other covered or partially covered areas. Wetness on a body is generally a problem because warm damp skin is a breeding ground for germs and infections. Getting a body completely dry under various situations is therefore a problem in the daily care of that individual.

As used herein, the term "baby-safe" shall mean something made safe for infants and young children by eliminating or minimizing potential hazards. Portable fans and hair dryers that are commercially available are not designed or even considered to be "baby-safe." Such hazards include, without limitation, objects that may become detached and swallowed, exposed fan blades, areas that may unintentionally catch on a baby's fingers or toes, and exposed elements which may burn or cut a baby's skin if touched.

One problem associated with portable fans and hair dryers is that one hand must be used at all times to hold and support the device while in operation. Such an arrangement is problematic in care giving because there are many instances where a care giver needs to be hands-free or use both hands to care for the baby, disabled individual or elderly adult. Fans and hair dryers known in the prior art tend be handheld or stationary. They are not configured to be easily adjustable in the hand to direct airflow as needed to the smaller spaces that are required in the care giving. Having a device that allows safe operation in a handheld and handsfree configuration is beneficial. Another problem is that the blades used in such devices are often not baby safe and certainly not designed to operate in close proximity to a baby.

Thus, there currently exist deficiencies associated with the prevention of diaper rash, and, in particular, with a baby-safe drying apparatus.

SUMMARY OF THE INVENTION

Accordingly, one aspect of the present invention is to provide a baby-safe drying apparatus, including a generally pair shaped housing having a bottom portion connected to a middle portion tapering to a top portion, an electric fan connected to an interior wall of the housing and operative to draw air into an air inlet and out an air outlet, and a rechargeable battery supported within the bottom portion. The housing has a generally hollow interior with the air inlet located on the bottom portion and the air outlet located on the top portion. The air outlet is generally perpendicular to the housing in an upright position. The electric fan is arranged to be baby-safe. The rechargeable battery operationally providing power to the electric fan. The lower portion has a greater mass than the middle and top portions such that the center of gravity of the housing is lowered.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figure 1A:
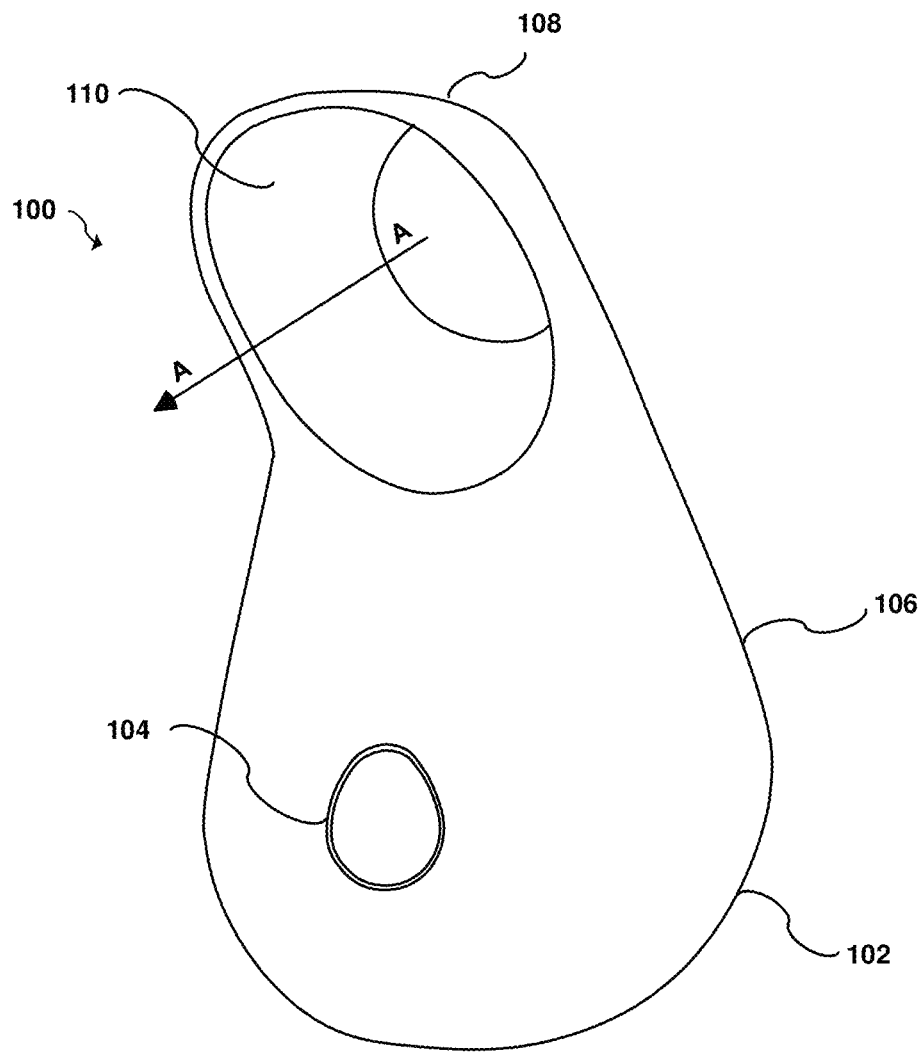
FIG. 1A is a perspective view of a baby-safe drying apparatus in accordance with an embodiment of the present invention.
Figure 1B:
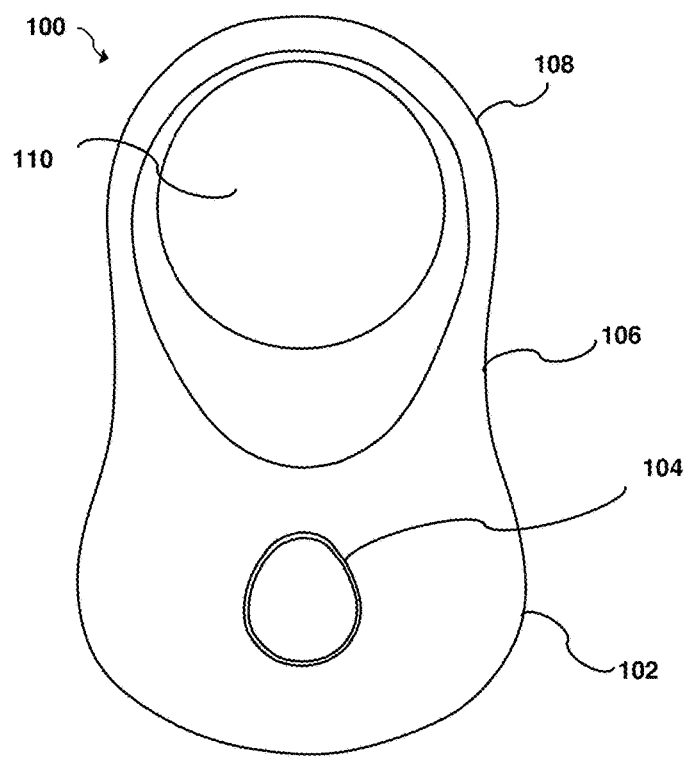
FIG. 1B is a front view of the baby-safe drying apparatus shown in FIG. 1A.
Figure 1C:
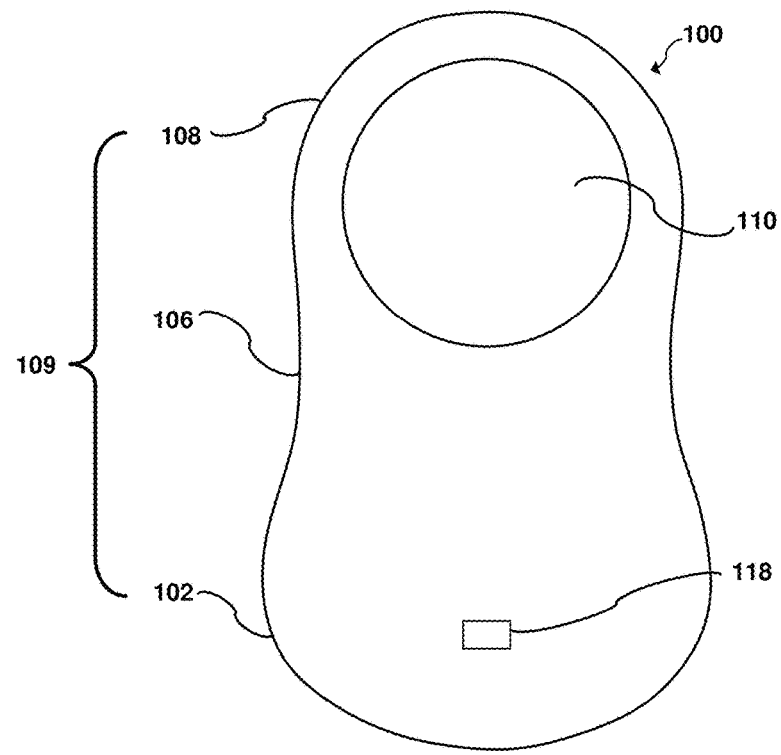
FIG. 1C is a rear view of the baby-safe drying apparatus shown in FIG. 1A.
Figure 1D:
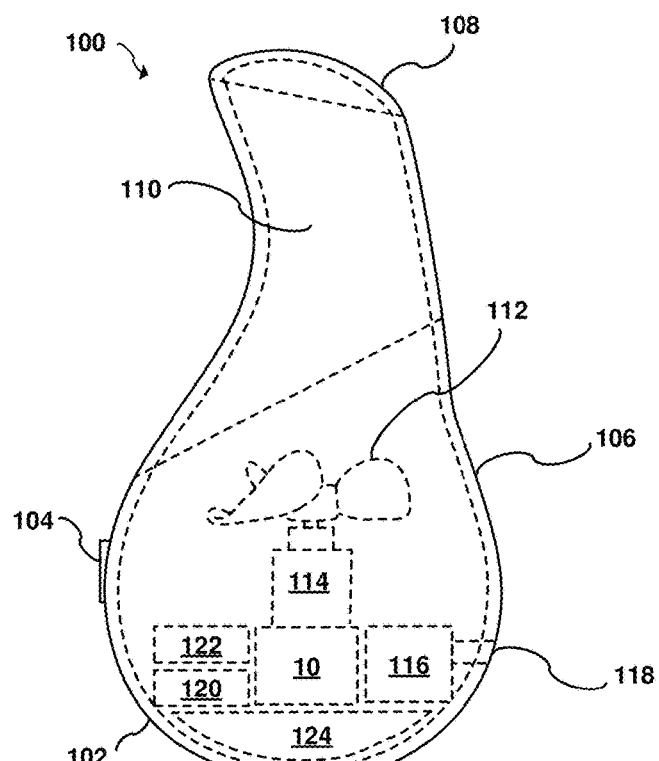
FIG. 1D is a side view of the baby-safe drying apparatus shown in FIG. 1A.

Referring now to the drawings, wherein like reference numerals designate identical or corresponding parts throughout the several views, preferred embodiments of the present invention are described.

Diaper rash is a common condition experienced by infants, which can be painful and may cause an infant to be fussy. Moisture is a common contributor to diaper rash. Keeping a diaper dry and clean is essential in the prevention and treatment of a diaper rash. It is therefore strongly encouraged to allow sufficient time to air dry the area where the diaper was applied after changing a diaper as well as give them time without a diaper during the day.

The present invention is may be utilized in the prevention and treatment of a diaper rash. The present invention may be operationally used without limitation as a handheld device and/or a standing device that can be positioned down near a baby, disabled individual or elderly adult. As such, the present invention may be operationally used, without limitation, after the baby's, disabled individual's or elderly adult's soiled diaper bottom has been cleaned with wipes, after a bath to quickly remove moisture from a diaper area, or while a baby, disabled individual or elderly adult is spending time without wearing a diaper. According to one non-limiting implementation, the baby-safe drying apparatus includes a "tumbler" or "roly-poly toy" like weighted bottom. As used herein, a "tumbler" or "roly-poly toy" like weighted bottom is a round-bottomed apparatus, usually egg-shaped, that tends to right itself when pushed at an angle. The apparatus may be substantially hollow with a weight inside the bottom hemisphere. The placement of this weight is such that the apparatus has a center of mass below the center of the hemisphere, so that any tilting raises the center of mass. When such an apparatus is pushed over, it wobbles for a few moments while it seeks the upright orientation, which has an equilibrium at the minimum gravitational potential energy. The exterior of the baby-safe drying apparatus in at least one embodiment comprises a material that allows bending and adjusting at will such that the angle of the airflow can be adjusted.

Such an arrangement allows the care giver to easily grip the device in a preferred operational use angle. It also allows the device to be placed next to a baby, disabled individual or elderly adult to continue to direct air flow towards the bottom areas. If the baby, disabled individual or elderly adult were to kick or otherwise accidently move the device, then the device would automatically re-correct its orientation. According to one embodiment, the present invention has interior fan blades for safety around an infant or young child.

The best way to prevent diaper rash is to keep the diaper area clean and dry. A few simple strategies can help decrease the likelihood of diaper rash developing on a baby's, disabled individual's or elderly adult's skin include, without limitation, changing diapers often, rinsing the bottom area with warm water after each diaper change and avoid using wipes with alcohol or fragrance. Air drying is a preferred natural prevention and treatment for a diaper rash. Some caregivers might be tempted to blow on the bottom area with their mouth to generate an airflow. However, such a practice unnecessarily introduces germs and may be dangerous to the baby, disabled individual or elderly adult. Use of the present invention may provide additional benefit by increasing the normal amount of airflow to the baby, disabled individual or elderly adult in a sanitary way.

Changing diapers often requires removing wet or dirty diapers promptly upon soiling. This must be done by all care providers, including daycare staff members, if any. A sink, tub or water bottle may be utilized for the purpose of rinsing the bottom area with warm water during each diaper change. Moist washcloths, cotton balls and baby wipes can aid in cleaning the skin. If soap is to be used, then a mild, fragrance-free soap should be utilized. Scrubbing the bottom area should be avoided because it can further irritate the skin and, instead, the area should be gently patted with a clean towel or let it air dry. Overtightened diapers should also be avoided because it prevents airflow into the diaper region, which sets up a moist environment favorable to diaper rashes. Tight diapers can also cause chafing at the waist or thighs. When possible, let the baby, disabled individual or elderly adult go without a diaper. Exposing skin to air is a natural and gentle way to let it dry. Laying a baby on a large towel and engage in some playtime while he or she is bare-bottomed may also be utilized to avoid messy accidents. The present invention may also be combined with a waterproof mat.

Applying a barrier ointment during each diaper change to prevent skin irritation. Petroleum jelly and zinc oxide are the time-proven ingredients in many diaper ointments. It is important for a care giver to thoroughly wash hands before and after changing a diaper. Hand washing can prevent the spread of bacteria or yeast to other parts of a baby's, disabled individual's or elderly adult's body, to the care giver or to others. In the past, it was common to use powders, such as cornstarch or talcum powder, to protect the bottom area skin and absorb excess moisture. Doctors no longer recommend this.

Referring to FIGS. 1A-1I, block diagrams illustrating a non-limiting exemplary baby-safe drying apparatus. Baby-safe drying apparatus 100 having a generally hollow pear shape with a larger generally elliptical bottom portion 102 connected to a middle portion 106 and tapering to a top portion 108. According to one embodiment, bottom portion 102 is operatively shaped to aid in righting the baby-safe drying apparatus 100 when it is pushed at an angle including, without limitation, a round-bottom, an egg-shaped and the like.

Figure 1E:
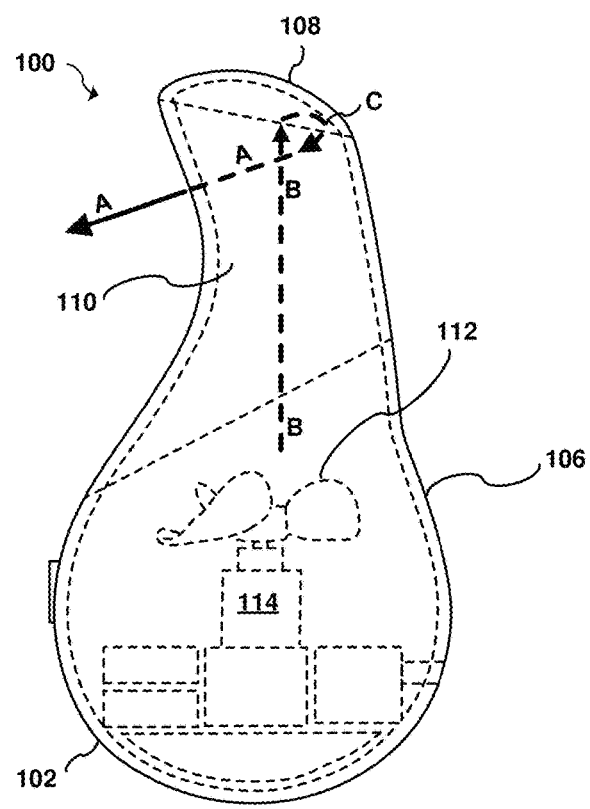
FIG. 1E is a side view of the baby-safe drying apparatus shown in FIG. 1A illustrating the airflow therein.
Figure 1F:
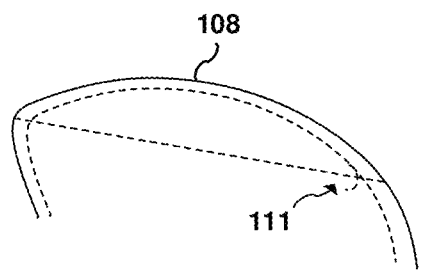
FIGS. 1F and 1G are zoomed in portion of side view of the baby-safe drying apparatus shown in FIG. 1A illustrating respectively a small opening in an top rear interior wall and the airflow flowing there thru.
Figure 1G:
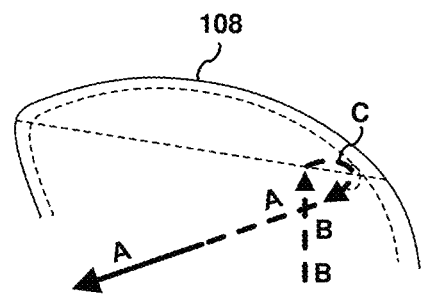
Figure 1H:
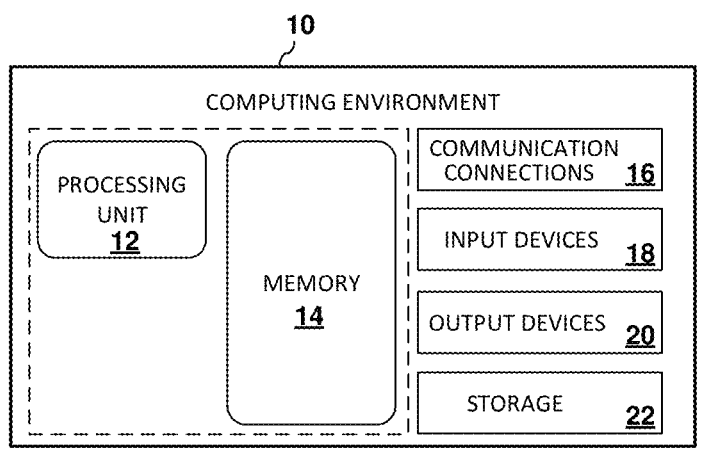
FIG. 1H is a block diagram illustrating the computing environment of the baby-safe drying apparatus shown in FIG. 1A.

The generally hollow baby-safe drying apparatus 100 includes an interior wall having a interior embedded fan connected thereto. Top portion 108 includes outlet opening 110 and bottom portion 102 includes an inlet opening (not shown). The embedded a baby-safe fan 112 located within the hollow interior of baby-safe drying apparatus 100 produces an airflow stream which is directed through the hollow interior of the baby-safe drying apparatus 100 and out outlet opening 110 such that there is an airflow stream in the direction of A-A. Referring to FIGS. 1E-1G, a non-limiting airflow within the generally hollow baby-safe drying apparatus 100 is shown. According to this embodiment, the embedded a baby-safe fan 112 located within the hollow interior of baby-safe drying apparatus 100 produces an airflow stream which is directed through the hollow interior in the direction of B-B, is redirected by in the curved direction of C-C and out outlet opening 110 in the direction of A-A. The airflow is redirected in the curved direction of C-C by means of air pressure within the top portion 108 and a small opening 111 in the rear wall of out outlet opening 110. According to one embodiment, opening 111 is located substantially around the entire perimeter of the rear wall of out outlet opening 110. In another embodiment, opening 111 is located at a top portion of the rear wall of out outlet opening 110.

Although the outlet opening 110 and the inlet opening are located in respectively the top portion 108 and bottom portion 102, it is understood that other locations may be utilized without departing from scope the present invention. According to one embodiment, the inlet opening may be located in the middle portion 104. According to another embodiment, an exterior portion of the inlet opening is located in the top portion 108 and is connected to an interior channel directing the intake airflow to an interior portion of the inlet opening being located either in the bottom portion 102 or middle portion 104 such that it is positioned below the baby-safe fan 112. According to yet another embodiment, outlet opening 110 is located in the bottom portion 102 and the inlet opening is located either in the top portion 108 or the middle portion 104.

According to at least one embodiment, bottom portion 102 includes a weighted portion such that the overall effect is for the baby-safe drying apparatus 100 to have a disproportionately low center of gravity such that it will automatically right itself to an upright operating position if baby-safe drying apparatus 100 is ever pushed or tilted over. According to one possible embodiment, the weighting portion may include one or more batteries. Middle portion 106 includes a on/off button 104.

Bottom portion 102, middle portion 106 and top portion 108 (collectively, the external surfaces 109) of the baby-safe drying apparatus 100 in at least one preferred embodiment comprises a material that allows bending and adjusting at will such that the angle of the airflow stream in the direction of A-A can be adjusted. External surfaces 109) may be composed of any baby-safe lightweight material including, without limitation, formed-plastic, synthetic plastic polymer, polyvinyl chloride (PVC), non-phthalate polyvinyl chloride (PVC) rubber, natural rubber, latex, soft TPR, TPE, biomass-based polymers, fabric, mesh and the like. External surfaces 109 may be without limitation, flexible, solid, inflatable and the like. Bottom portion 102 and/or middle portion 106 includes, without limitation, a baby-safe fan 112 connected to a motor 114, a computing environment 10, and a rechargeable battery 116. Importantly, baby-safe fan 112 is positioned such that it is out of reach of a baby which is an essential element in order for the present invention to be "baby-safe." Computing environment 10 includes, without limitation, a processing unit 12, memory 14, one or more communication connections 16, one or more input devices 18, one or more output devices 20, and storage 22.

On/off button 104 is configured to initiate or terminate rechargeable battery 116 from providing electrical power to the components requiring an electrical current to operate. Rechargeable battery 116 is connected to a power connector 118 configured to recharge rechargeable battery 116. According to an optional embodiment, the initiation or termination of rechargeable battery 116 providing electrical power may be controlled remotely from an external Bluetooth compatible device, such, as without limitation, a PDA, a computer, a cellular device, and the like.

According to at least one embodiment, the bottom portion 102 includes a weighted portion 124 operationally configured to lower the center of mass below the center of the hemisphere of the baby-safe drying apparatus 100, so that any tilting raises the center of mass. In another embodiment, the motor 114, rechargeable battery 116, computing environment 10 are operatively positioned such that they collectively operate as a weight instead of or in addition to weighted portion 124. Weighted portion 124 may contain, without limitation, sand, any granular material, or any other weight providing material such that the overall effect is for the baby-safe drying apparatus 100 to have a disproportionately low center of gravity such that it will automatically right itself to an upright operating position if baby-safe drying apparatus 100 is ever pushed or tilted over.

According to an alternate embodiment, bottom portion 102, middle portion 106 and/or top portion 108 are sheer enough for light to pass therethrough. In this embodiment, a baby-safe light 122 is utilized such that the baby-safe drying apparatus may be configured to provide lighting. Baby-safe light 122 may be comprised of, without limitation, a light-emitting diode "LED", surface mounted diodes, a flexible LED chain, a fluorescent bulb, an incandescent bulb and the like. It is understood that baby-safe light 122 may comprise any possible light providing source within the scope of the invention. According to an alternative embodiment, on/off button may also be illuminated for ease of use by the care giver.

According to another alternative embodiment, baby-safe drying apparatus 100 includes a speaker 120 connected to a controller 12 configured to play music in an operational use. Optionally, the controller may be connected to a Bluetooth receiver or the like (communications connection 16) to receive music from an external Bluetooth compatible device, such, as without limitation, a PDA, a computer, a cellular device, an audio component and the like.

According to yet another alternative embodiment, baby-safe drying apparatus 100 includes a dehumidifier. Baby-safe drying apparatus 100 also may include, without limitation, a heating element configured in coordination with baby-safe fan 112 to such a heated airflow stream is produced in the direction of A-A.

Figure 1I:
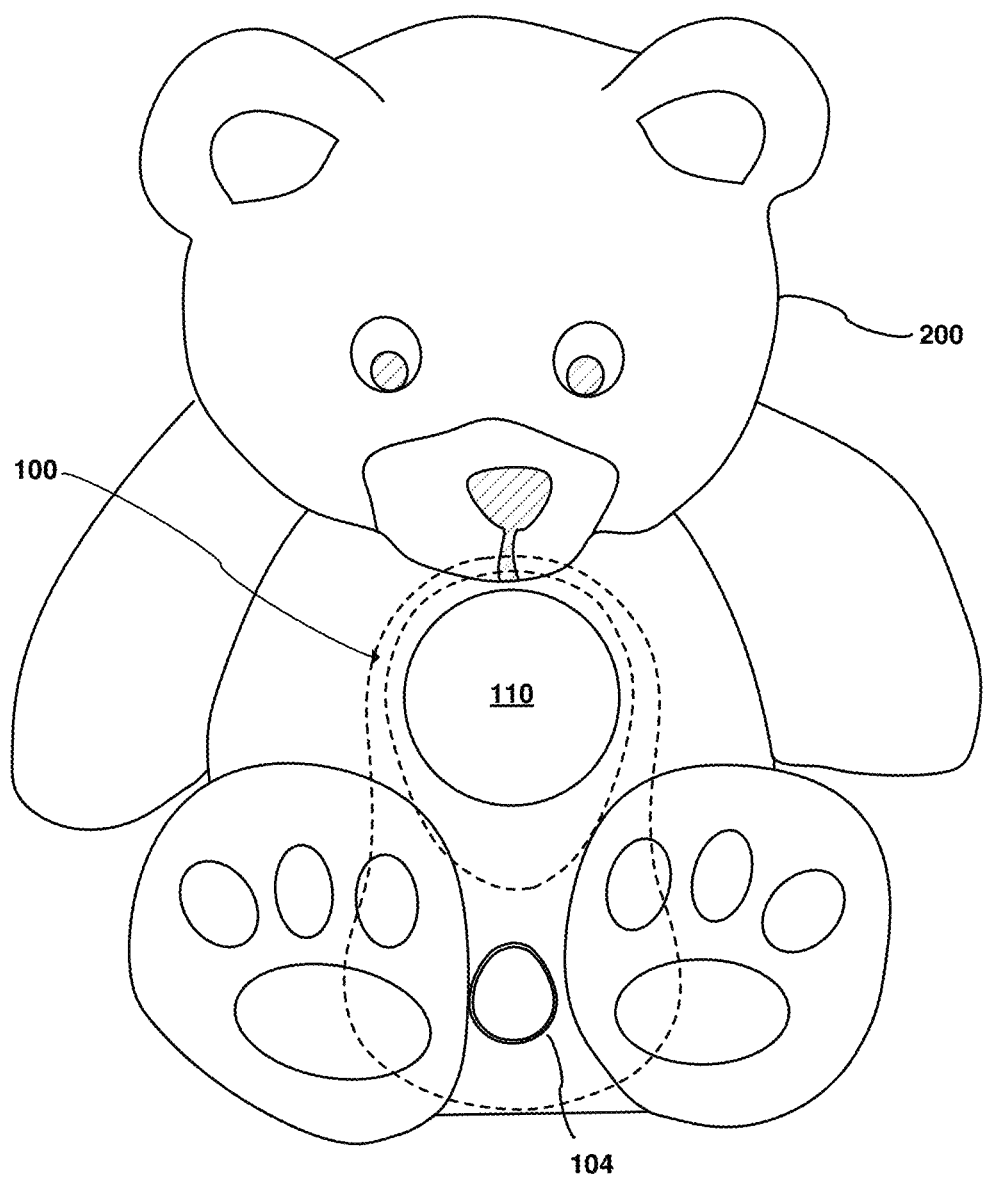
FIG. 1I is a front view of the baby-safe drying apparatus shown in FIG. 1A contained within an optional baby-friendly external wrapping.

Referring to FIG. 1I, a front view of the baby-safe drying apparatus contained within an optional baby-friendly external wrapping is shown. According to this optional embodiment, a baby-friendly external wrapping 200 is slipped over baby-safe drying apparatus 100 by means of an opening (not shown) on the bottom of the baby-friendly external wrapping 200. Baby-friendly external wrapping 200 also includes opening operationally sized to the size of outlet opening 110 such the airflow stream in the direction of A-A is not impaired. Baby-friendly external wrapping 200 may be without limitation, flexible, solid, inflatable and the like. The materials used in the baby-friendly external wrapping 200 may be composed of any baby-safe lightweight material including, without limitation, formed-plastic, synthetic plastic polymer, biomass-based polymers, fabric, mesh and the like.

Although the present invention is described herein for use with a baby, it is understood that there is no limitation with respect to its use. In particular, it is understood that a baby-safe drying apparatus may be utilized for use with an elderly adult or anyone else.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, portions of the invention may be embodied as a method, device, or computer program product. Accordingly, portions of the present invention may take the form of an entirely hardware embodiment or an embodiment combining software and hardware aspects all generally referred to as a "circuit" or "module."

The present invention includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in any programming language including without limitation, object-oriented programming languages such as Java®, Smalltalk, C# or C++, conventional procedural programming languages such as the "C" programming language, visually oriented programming environments such as Visual Basic, and the like.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A baby-safe drying apparatus comprising:
a generally pear shaped housing having a bottom portion connected to a middle portion tapering to a top portion, wherein the housing has a generally hollow interior with an air inlet to the hollow interior located on the bottom portion and an air outlet to the hollow interior located on the top portion, wherein the air outlet is generally perpendicular to the housing in an upright position;
an electric fan connected to an interior wall of the housing and operative to draw air into the hollow interior through the air inlet and out the hollow interior through the air outlet, the electric fan being arranged to be baby-safe;
a rechargeable battery supported within the bottom portion, the rechargeable battery operationally providing power to the electric fan; and
wherein the lower portion has a greater mass than the middle and top portions such that the center of gravity of the housing is lowered.

2. The apparatus of claim 1, wherein the lowered center of gravity of the housing causes the housing to automatically come to rest in an upright position when oriented in a non-upright position.

3. The apparatus of claim 1, wherein the housing comprises a molded plastic material.

4. The apparatus of claim 3, wherein at least a portion of the housing comprises a fabric.

5. The apparatus of claim 3, wherein the housing comprises an inflatable material.

* * * * *